April 21, 1953            P. GARINE            2,636,059

ELECTRIC ACCUMULATOR WITH ZINC ELECTRODES

Filed April 16, 1952

INVENTOR.
PAUL GARINE
BY
Karl F. Ross
AGENT

Patented Apr. 21, 1953

2,636,059

UNITED STATES PATENT OFFICE 2,636,059

ELECTRIC ACCUMULATOR WITH ZINC ELECTRODES

Paul Garine, Paris, France, assignor to Yardney International Corp., New York, N. Y., a corporation of New York Application April 16, 1952, Serial No. 282,628
In France April 19, 1951

1 Claim. (Cl. 136—30)

This invention relates to electro-chemical energy generators having zinc electrodes, and more particularly to silver-zinc accumulators.

An object of the invention is to provide a conductive electrode-supporting means which will be both inert electro-chemically and rigid and strong mechanically.

According to the invention such an electrode support consists of a magnesium element imbedded in the powder composition which comprises the electrode, i. e. in the zinc or zinc compound powder in the case of a negative electrode, or silver or silver compound powder in the case of a positive electrode. In the latter case, the magnesium is desirably coated with a suitable composition which will not form an electric couple with the silver, such composition for example being silver itself. The coating may be deposited on the magnesium by successive electrolysis of zinc, copper, nickel and finally silver.

The magnesium element may be in the form of a (preferably perforate) plate, or lattice, network, grating, or any suitable configuration.

The magnesium element advantageously provides a support not only for the active substance of the electrode, which substance may be in the form of a powder, but it may further serve to support an electrical connecting member imbedded in said powder. This member may desirably assume the form of a magnesium strip or lug integral with the magnesium element, although it migh alternatively be provided in the form of a wire of other metal, e. g. silver, attached to the element in any appropriate way.

In a modification, the electro-chemically active substance associated with the magnesium may be provided in a more highly cohering or solid state. In this aspect, the invention provides an electrode consisting of a magnesium support surrounded with a zinc sheet element. During the electro-chemical reaction process, the structure or texture of the sheet may vary.

Figure 1:
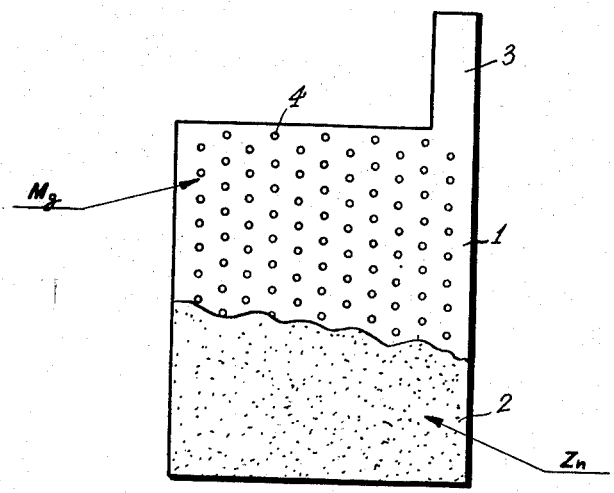
Fig. 1 shows one form of embodiment of a negative electrode according to the invention, shown in side elevation.

Referring to Fig. 1, a perforate magnesium plate 1 is imbedded in a mass 2 of zinc oxide powder, part of which is shown removed in order to make the plate visible. A lug 3, made of magnesium and integral with the plate 1, is provided at the top of the plate and serves as a connecting terminal for the negative electrode comprising the powder 2 and support 1. The mass of powder 2 penetrates the perforations 4 of plate 1 to constitute in effect a mechanically and electrically integral unit with the magnesium support.

One or more electrodes provided with conductive supports according to the invention may be used in a silver-zinc accumulator, the active substances of opposite polarity being separated by a semi-permeable sheet material element, such as regenerated cellulose or cellophane, the assembly being impregnated with alkali electrolyte, such as an aqueous solution of potassium hydroxide or an aqueous solution of potassium zincate.

Figure 2:
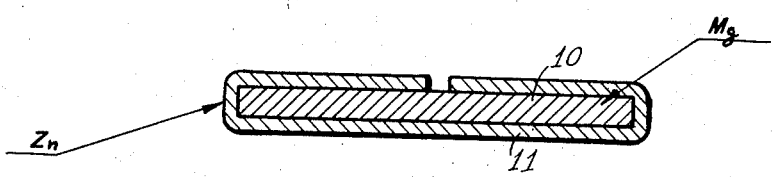
Fig. 2 is a sectional view of a modified form.

In another form of embodiment, shown in Fig. 2, the electrode comprises an element 10 made of magnesium which may be in the form of a plate, preferably perforate, or a grating, or the like, wrapped in a zinc sheet 11. The assembly may be contained in a wrapper or pack of regenerated cellulose or cellophane.

In this form, the electric connecting member may be formed on the magnesium element.

What I claim is:

An electrode for electro-chemical generator of energy, comprising a flat magnesium support and a zinc sheet surrounding said support and contacting this latter.

PAUL GARINE.

References Cited in the file of this patent

UNITED STATES PATENTS

| Number | Name | Date |
| --- | --- | --- |
| 684,204 | Edison | Oct. 8, 1901 |
| 684,205 | Edison | Oct. 8, 1901 |
| 2,317,711 | Andre | Apr. 27, 1943 |
| 2,561,943 | Moulton et al. | July 24, 1951 |